Nov. 13, 1956      A. DRAKOFF      2,770,389
SCREEN COVERING FOR FRYING PANS AND THE LIKE
Filed Oct. 18, 1954      3 Sheets-Sheet 1
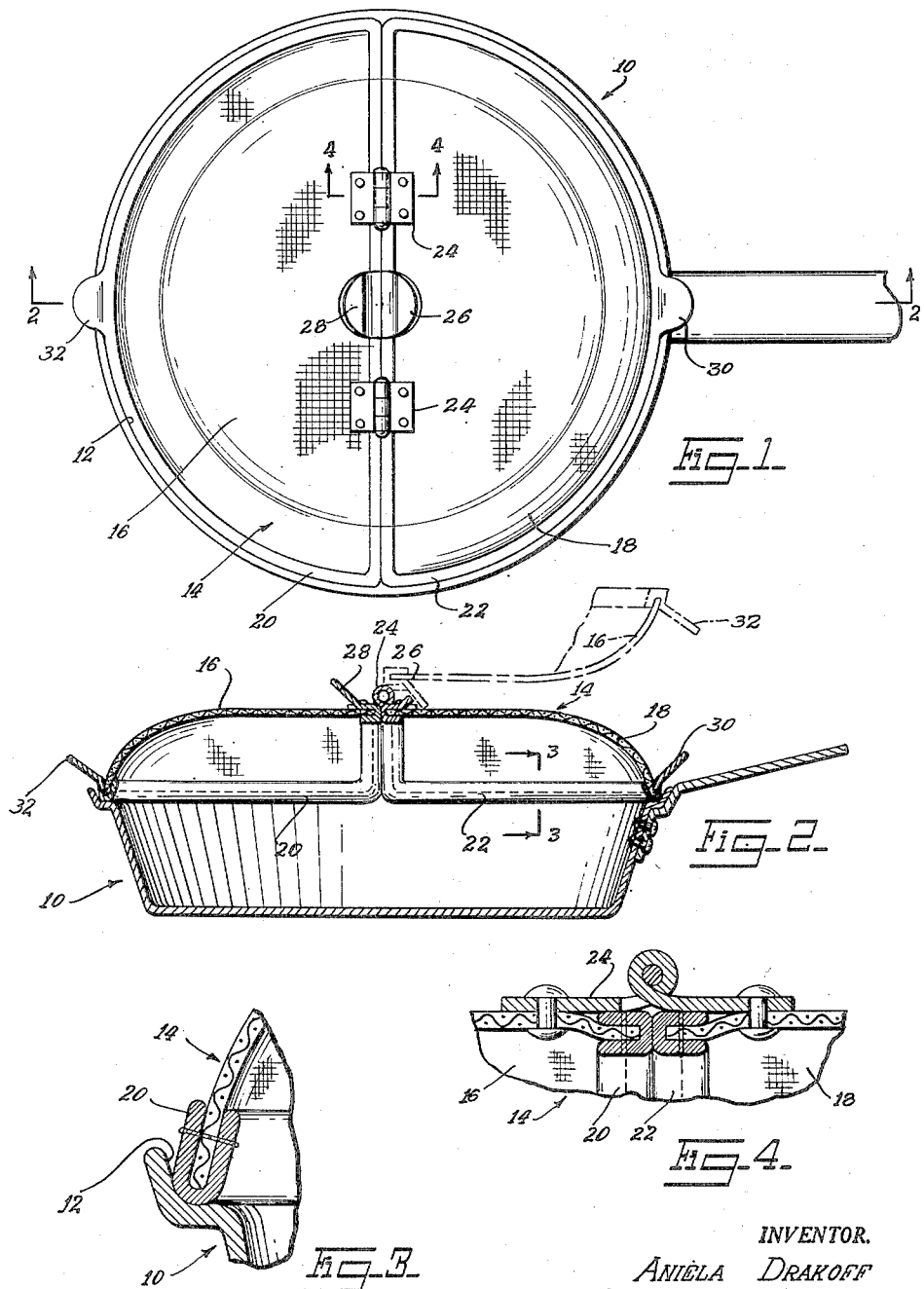
INVENTOR.
ANIELA DRAKOFF
BY
ATTORNEY

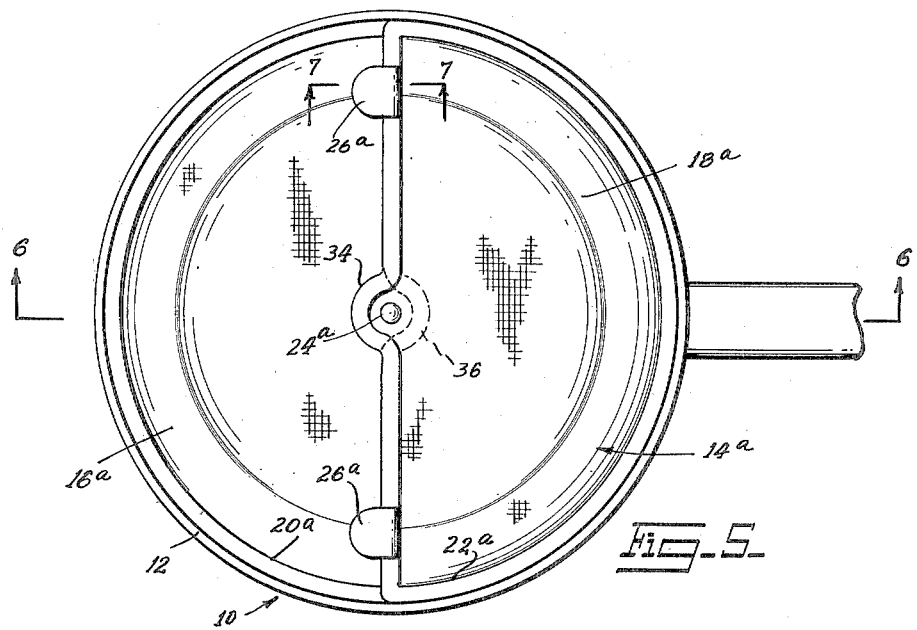
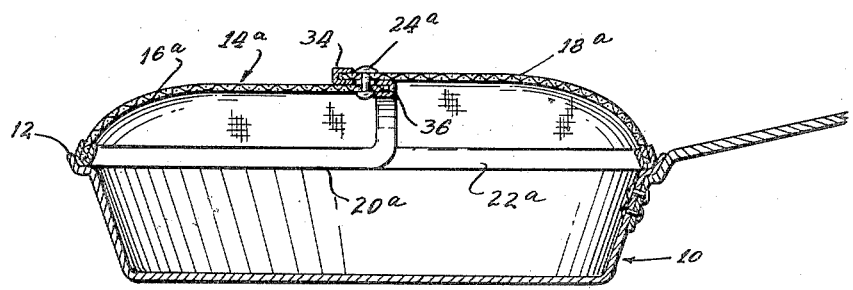
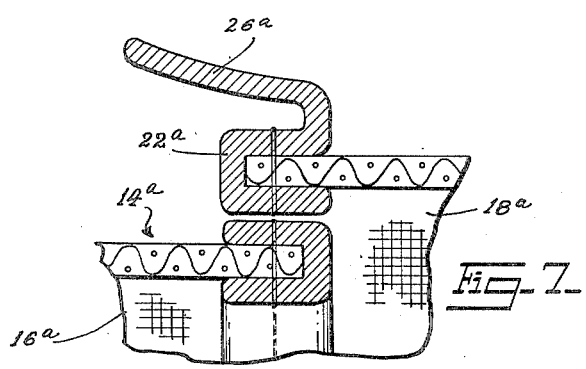

Nov. 13, 1956  A. DRAKOFF  2,770,389
SCREEN COVERING FOR FRYING PANS AND THE LIKE
Filed Oct. 18, 1954  3 Sheets-Sheet 3

INVENTOR.
ANIELA DRAKOFF
BY
Zoltan H Holschitz
ATTORNEY

United States Patent Office 2,770,389
Patented Nov. 13, 1956

2,770,389

SCREEN COVERING FOR FRYING PANS AND THE LIKE

Aniela Drakoff, Hartford, Conn.

Application October 18, 1954, Serial No. 462,980

2 Claims. (Cl. 220—44)

This invention relates to covers for skillets, frying pans, or the like, and more particularly, has reference to a cover which, when applied to a pan, will prevent splattering of grease, while still affording full visibility of the foods being cooked.

Heretofore, while it has been proposed to protectively cover frying pans or skillets, the covers which have been devised have usually not permitted full visibility of the contents. Further, some types of foods should be cooked in an open frying pan, rather than in a covered one, and in such instances a frying pan cover, whether transparent or not, cannot be employed.

It is, of course, always desirable to protect one's self against the splattering or popping of grease, and the present invention has as an important object thereof the provision of a device applicable to the pan, in covering relation thereto, to prevent the splattering of grease, with said device nevertheless permitting full visibility of the food within the pan and permitting the food to cook in the same manner as it would in an uncovered, open pan.

To this end, the present invention comprises a cover of wire screen material, which is of a mesh that will prevent grease from passing therethrough, but will at the same time permit full visibility of the contents of the pan.

Another object is to provide a cover as stated which can be adjusted to a position in which it only partially covers the pan, whenever desired, to permit the contents of the pan to be turned over, moved about, etc.

Another object is to provide a cover which, in at least one form, includes a section that is swingable upwardly so as to be supported upon a cooperating section, with the first section in its upwardly swung position forming a repository for foods, so that said foods can be kept warm over a frying pan in which other foods are being cooked.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Fig. 1 is a top plan view of a cover embodying one form of the invention applied to a frying pan.

Fig. 2 is a sectional view on line 2—2 of Fig. 1.

Fig. 3 is an enlarged detail section on line 3—3 of Fig. 2.

Fig. 4 is an enlarged detail section on line 4—4 of Fig. 1.

Fig. 5 is a top plan view of a modified form.

Fig. 6 is a sectional view on line 6—6 of Fig. 5.

Fig. 7 is an enlarged, detail sectional view on line 7—7 of Fig. 5.

Figure 8:
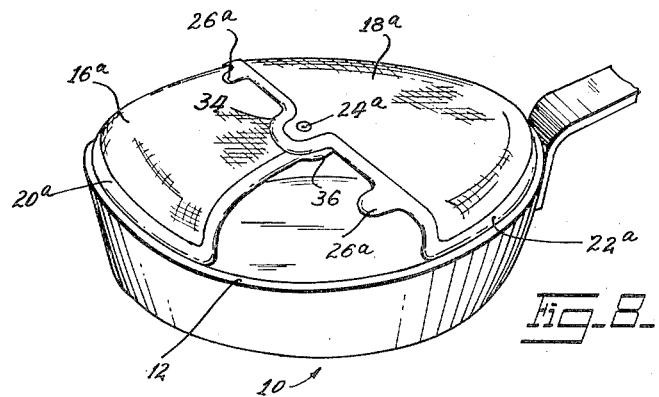
Fig. 8 is a perspective view of the form shown in Figs. 5–7, in a partially open position.

In the form of the invention shown in Figs. 1–4, a conventional frying pan 10 has applied thereto a protective screen cover 14 formed in accordance with the invention. The frying pan 10 has a peripheral, outwardly offset flange 12 forming a seat for the marginal portion of the cover, as best shown in Figs. 2 and 3.

The cover includes complementary, semicircular, upwardly concavo-convex sections 16, 18. Each of these is of wire screen material, of a mesh selected to prevent splattering of grease from the frying pan while still affording full visibility of the pan contents.

The margins of the wire screen bodies of the sections 16, 18 are bound by strips of heat and fire resistant fabric 20, 22. The bindings 20, 22 are formed to U-shaped cross sections, and are stitched or otherwise permanently secured to the margins of the wire mesh sections.

The sections are hingedly connected along their contacting, straight, inner edges by hinges 24 spaced longitudinally of said edges and riveted as shown in Fig. 4 to the adjacent sections. Other means can be employed to secure the hinges to the sections, it being mainly important that the sections be connected for relative swinging movement about an axis extending diametrically thereof in a horizontal plane passing through the crest or dome portion of the cover.

Integral with the bindings, medially between the opposite ends of the hingedly connected ends of the sections, are upwardly divergent, oppositely extending tabs 26, 28. One or both of these can be grasped in lifting the cover from the pan, or in applying the cover to the pan.

At diametrically opposite locations upon the sections the peripheral bindings are integrally formed with outer tabs 30, 32, these being disposed medially between opposite ends of the arcuate edges of the sections.

The purpose of the tabs or handles 30, 32 is to permit either section to be swung about the hinge connection to a position in which it is supported upon the other section. For example, as shown in Fig. 2, the handle 32 has been grasped, and the section 16 has been swung to a dotted line position in which it forms a dish-like repository for foods as, for example, rolls or biscuits, which one may desire to keep warm while other foods are cooking directly in the pan. The heat rising from the pan passes through the section 18, and continues on upwardly through the wire mesh body of the section 18, so as to penetrate the articles supported upon the body 16.

In the form of the invention shown in Figs. 5–8, the cover is again formed of wire mesh material of upwardly concavo-convex form, and is composed of a pair of semicircular sections 16ᵃ, 18ᵃ, peripherally bound at 20ᵃ, 22ᵃ, respectively. In this form, instead of a hinge connection whereby the sections are relatively pivotable about a horizontal axis passing through the crest of the cover, said sections are connected for relative movement about a vertical axis extending centrally of the cover, so that the sections pivot in horizontal planes relative to one another.

Thus, a pin 24ᵃ is used, passing through the sections. The sections have, intermediate opposite ends of their straight inner edges, outwardly projecting portions 34, 36, respectively, through which pin 24ᵃ extends, said portions overlapping as shown in Fig. 6.

At opposite sides of and spaced from the pivotal connection 24ᵃ, tabs 26ᵃ are integrally formed upon the binding 22ᵃ of section 18ᵃ. Either of these can be grasped, for swinging the section 18ᵃ about the axis of the pin 24ᵃ between a normal, closed position shown in Fig. 5, and any of a plurality of open positions one of which is shown in Fig. 8. In Fig. 8, the covers are only partially open. It will be understood that the section 18ᵃ could be swung further about pin 24ᵃ, until it is fully registered with the section 16ᵃ, thereby exposing fully half the area of the frying pan.

If desired, outer tabs can also be used on the modified form shown in Figs. 5–8, but these are not believed necessary, since the cover can be lifted by grasping one or both of the tabs 26ª.

Figure 9:
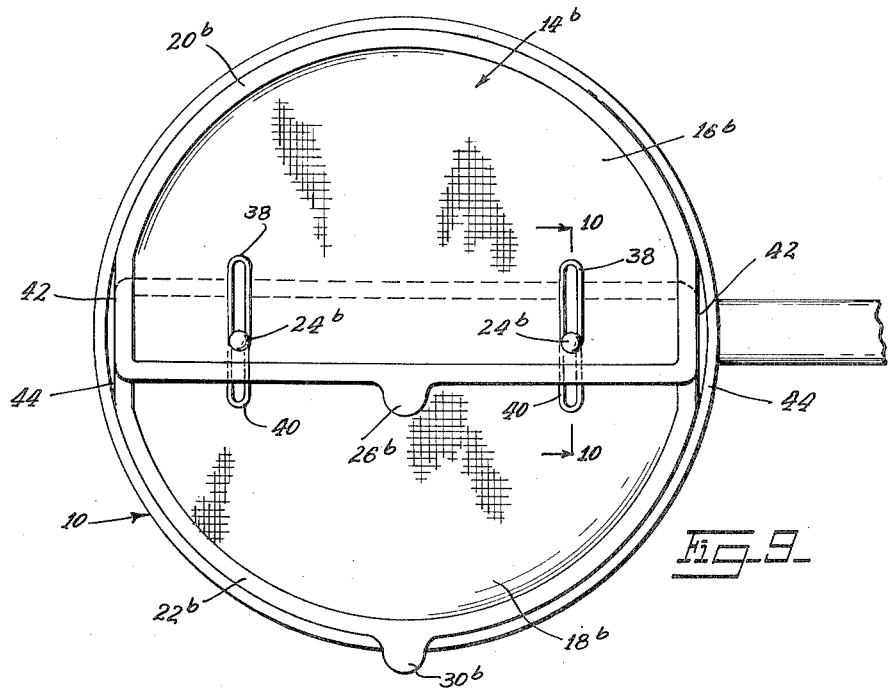
Fig. 9 is a top plan view of a second modification.
Figure 10:
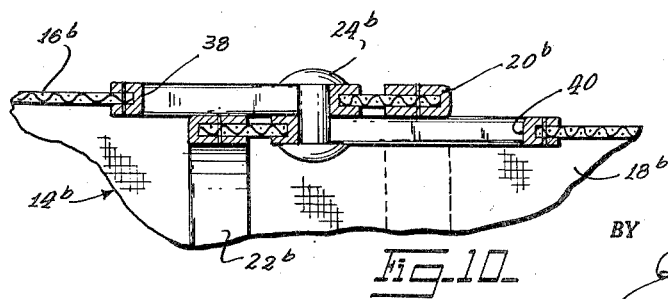
Fig. 10 is an enlarged, detail sectional view on line 10—10 of Fig. 9.

In Figs. 9 and 10, another modification is shown, designated generally at 14ᵇ and comprising cooperating sections 16ᵇ, 18ᵇ. In this form, the sections each extend over more than half the area of the circle defined by the cover and, accordingly, the inner edge portions of the sections overlap to a substantial degree, as best shown in Fig. 9.

In this arrangement, the sections are connected for relative sliding movement, the sections being connected by pins 24ᵇ spaced longitudinally of the overlapping inner edge portions of the sections.

The section 16ᵇ is peripherally bound at 20ᵇ, and integrally formed upon the binding is a tab 26ᵇ between the pins 24ᵇ, which tab can be grasped for imparting sliding movement to the section 16ᵇ whenever desired. Further, the tab can be used for lifting the cover from the pan.

The section 18ᵇ is peripherally bound as at 22ᵇ.

Formed in the respective sections are pairs of slots 38, 40. Slots 38 are extended in parallel relation, in perpendicularity to the straight inner edges of the sections. Slots 40 are similarly arranged, the pins 24ᵇ passing through both slots. As a result, not only can the section 16ᵇ be pulled from its closed position to expose that portion of the pan shown at the top in Fig. 9, but also, with section 16ᵇ left in its closed position, section 18ᵇ can be shifted to expose the diametrically opposite portion of the pan, by grasping a tab 30ᵇ and adjusting the section 18ᵇ slidably in the direction of the other section.

To permit the relative sliding movement of the sections, they are provided at opposite ends of their straight inner edges, with straight edge portions 42, 44 respectively.

Of course, both sections can be simultaneously shifted inwardly to expose diametrically opposite portions of the pan.

In all forms of the invention, there is the common characteristic wherein a sectionally constituted cover can be selectively disposed in full or partially covering relation to a pan, with said cover being so designed as to permit full visibility of the contents, while at the same time being designed to prevent splattering of grease.

Of course, the cover can be cleaned with comparative ease, since there are presently on the market cleaning pads of metallic mesh formation that are well adapted to clean wire mesh material.

While I have illustrated and described the preferred embodiments of my invention, it is to be understood that I do not limit myself to the precise constructions herein disclosed and the right is reserved to all changes and modifications coming within the scope of the invention as defined in the appended claims.

Having thus described my invention, what I claim as new, and desire to secure by United States Letters Patent is:

1. A protective cover for pans comprising a pair of complementary cover sections proportioned to cover a pan, said sections being of an open mesh material, and means connecting the sections for relative movement between a position in which said sections completely cover said pan, and a position in which the pan is partially uncovered, said means comprising a pair of spaced pins on which the sections are mounted to slide independently of one another, the sections having overlapping portions through which said pins extend, said overlapping portions being formed with spaced slots, with each pin extending through one slot of one section and one slot of the other section, the slots through which each pin extends being aligned longitudinally.

2. A protective cover for pans comprising a pair of complementary cover sections proportioned to cover a pan, said sections being of an open mesh material, and means connecting the sections for relative movement between a position in which said sections completely cover said pan, and a position in which the pan is partially uncovered, said means comprising a pair of spaced pins on which the sections are mounted to slide independently of one another, the sections having overlapping portions through which said pins extend, said overlapping portions being formed with spaced slots, with each pin extending through one slot of one section and one slot of the other section, the slots through which each pin extends being aligned longitudinally, said sections when in a full pan-covering position being disposed with the slots of one section registering only at one end with one end of the slots of the other sections, each section, when moved away from its full pan-covering position, having its slot registered with the slots of the other section to a correspondingly increased extent.

References Cited in the file of this patent

UNITED STATES PATENTS

| | | |
|---|---|---|
| 562,577 | Clasen | June 23, 1896 |
| 605,425 | Harvey | June 7, 1898 |
| 950,844 | Dolan | Mar. 1, 1910 |
| 2,498,534 | Drum | Feb. 21, 1950 |
| 2,606,686 | Barranco | Aug. 12, 1952 |

FOREIGN PATENTS

| | | |
|---|---|---|
| 26,018 | Great Britain | 1904 |
| 559,643 | France | June 20, 1923 |
| 534,591 | Germany | Sept. 29, 1931 |